United States Patent [19]

Kawamata et al.

[11] 4,064,224

[45] Dec. 20, 1977

[54] METHOD OF MAKING FIBROUS ALKALI TITANATES

[75] Inventors: Takashi Kawamata, Takatsuki; Tsuneo Inoue, Moriguchi; Eiichi Hirota, Hirakata, all of Japan

[73] Assignee: Matsushita Electric Industrial Co., Ltd., Japan

[21] Appl. No.: 653,120

[22] Filed: Jan. 28, 1976

[30] Foreign Application Priority Data

Feb. 5, 1975 Japan .................................. 50-15577

[51] Int. Cl.$^2$ .............................................. C01G 23/00
[52] U.S. Cl. ................................................... 423/598
[58] Field of Search ................. 423/598; 264/DIG. 19

[56] References Cited

U.S. PATENT DOCUMENTS

| | | | |
|---|---|---|---|
| 2,841,470 | 7/1958 | Beny ..................................... | 423/598 |
| 3,129,105 | 4/1964 | Beny et al. ............................ | 423/598 |
| 3,328,117 | 6/1967 | Emslie et al. ........................ | 423/598 |
| 3,380,847 | 4/1968 | Lewis et al. .......................... | 423/598 |
| 3,760,068 | 9/1973 | Winter et al. ........................ | 423/598 |
| 3,952,090 | 4/1976 | Shimizu et al. ...................... | 423/598 |

*Primary Examiner*—Herbert T. Carter
*Attorney, Agent, or Firm*—Wenderoth, Lind & Ponack

[57] ABSTRACT

A method of making fibrous alkali titanates comprising the steps of preparing a mixture including a titanium compound and an alkali metal compound in a molar ratio of 1.0 to 8.0 in terms of $TiO_2:M_2O$ (M: Na, K, Rb, Cs), heating said mixture at a temperature of 1200° to 1600° C to the molten (liquid) phase, cooling the thus heated mixture to room temperature, and washing the thus treated product. This method is advantageous because fibrous alkali titanates of large ratio of length to diameter can be easily produced in high yield.

14 Claims, No Drawings

METHOD OF MAKING FIBROUS ALKALI TITANATES

This invention relates to a method of making fibrous alkali titanates, and more particularly to a simple and effective method of making fibrous alkali titanates at atmospheric pressure.

Fibrous alkali titanates, which are inorganic fibrous materials, are excellent thermal insulators at high temperature, and are expected to be effectively used as various insulating means and composite materials. Fibrous alkali titanates include tetra-alkali titanates $M_2O.4TiO_2$ and hexa-alkali titanates $M_2O.6TiO_2$, wherein M designates one or more elements selected from Na, K, Rb and Cs. Hexa-alkali titanates are superior to tetra-alkali titanates with respect to insulating ability at high temperature.

Conventionally, there are known several methods of making such fibrous alkali titanates. For example, U.S. Pat. No. 2,833,620 discloses a method of making fibrous alkali titanates by a hydrothermal reaction of a mixture of water-soluble alkali metal compound and titanium oxide at a temperature higher than 400° C and at a pressure higher than 200 kg/cm$^2$. Also, U.S. Pat. No. 2,841,470 discloses a method of obtaining fibrous alkali titanates by first melting a halogenide of alkali metal at a temperature lower than 1200° C and then dissolving titanium dioxide or non-fibrous alkali titanate into the molten halogenide up to saturation. Further, U.S. Pat. No. 3,328,117 discloses a non-fluid reaction type method of making fibrous alkali titanates by mixing an alkali metal compound containing oxygen with a titanium compound containing oxygen in a drying state, pressing the mixture, calcining the pressed body at a temperature of 200° to 1150° C to a non-fluid phase and separating the fibrous material from the calcined product.

The method disclosed in U.S. Pat. No. 2,833,620 is disadvantageous in that by using titanium oxide or titanium hydroxide, the reaction is not completed even after a long time at a high temperature and a high pressure, so that there remains a part of starting materials which are not reacted, and thus it is difficult to obtain pure fibrous product. The method disclosed in U.S. Pat. No. 2,841,470 is disadvantageous in that it produces air-polluting gas ($F_2$, $Cl_2$), and the yield is low (the amount of titanium dioxide or non-fibrous alkali titanate which can be dissolved in the molten halogenide of alkali metal is limited) due to melting halogenide of alkali metal at a high temperature and usually producing both hexa-alkali titanate and tetra-alkali titanate. Besides, in U.S. Pat. No. 3,328,117, there still is a problem of low yield (low conversion rate from starting materials to fibrous alkali titanates).

Therefore, an object of this invention is to provide a method of making fibrous alkali titanates which can be easily and effectively carried out by means of thermal decomposition of the mixture of titanium compound and alkali metal compound under atmospheric pressure.

Another object of this invention is to provide a method of making, with high yield, fibrous alkali titanates having large ratio of length to diameter.

A further object of this invention is to provide a method of making pure fibrous hexa-alkali titanates by means of a re-heat treatment.

A still further object of this invention is to provide a method of making amorphous alkali titanate having long fibrous forms, which can be converted to crystalline fiber by heating.

These and other objects and features of this invention will become clear from consideration of the following detailed description.

A method of this invention comprises: preparing a mixture including a titanium compound and an alkai metal compound in a molar ratio of 1.0 to 8.0 in terms of $TiO_2:M_2O$, M designating one or more elements selected from Na, K, Rb and Cs; heating said mixture to the molten state at a temperature of 1200° to 1600° C; cooling the thus heated mixture to room temperature; and washing the thus treated product, said molar and ratio being more preferably from 3.0 to 6.0, said heating temperature being more preferably from 1200° to 1400° C, and said cooling rate being preferably less than 1600° C.

Preferred titanium compounds are $TiO_2$, $Ti_2O_3$, $H_4TiO_4$, $H_2TiO_3$, $Ti(OH)_4$, $TiOSO_4$, $TiCl_2$, $TiCl_3$, $TiCl_4$, $Ti(SO_4)_2$ and $Ti_2(SO_4)_3$, which form $TiO_2$ by heating. Among these compounds, $TiO_2$, $Ti_2O_3$, $H_4TiO_4$, $H_2TiO_3$ and $Ti(OH)_4$ are more preferred. Preferred alkali metal compounds are $M_2O$, $M(OH)$, $M_2CO_3$, $MNO_3$, $MHCO_3$, $M_2SO_4$, $MCl$ and $MF$, which M is one or more elements selected from Na, K, Rb and Cs and which form $M_2O$ by heating. Among these compounds, $M_2O$, MOH, $M_2CO_3$, $MNO_3$ and $MHCO_3$ are more preferred. The preferred molar ratio of $TiO_2$ to $M_2O$ in the mixture is 1.0 to 8.0, more preferably 3.0 to 6.0. If the molar ratio is too small, the final product undesirably contains amorphous and non-fibrous material. If the molar ratio is too large, a final product undesirably contains non-fibrous material such as $TiO_2$. The starting materials, i.e., a titanium compound and an alkali metal compound in the aforesaid molar ratio are well mixed, if necessary with water or alkali solution. The mixture is put into a corrosion-resistant crucible such as one of alumina, chamotte or platinum and is placed in an electric or gas furnace which is provided with a thermocouple for measuring the reaction temperature. The crucible having the mixture therein is heated at a temperature of 1200° to 1600° C, preferably 1200° to 1400° C, at a suitable heating rate, maintained at the reaction temperature for a time sufficient (e.g., more than 20 minutes) to cause the mixture to become thoroughly molten and form the desired fibrous alkali titanates after the subsequent cooling step, which time depends on the reaction temperature and the above described composition. The thus molten mixture is then cooled at a suitable cooling rate, preferably less than 1600° C/hr, to room temperature. The preferred atmosphere for the heating step is air, oxygen, nitrogen or an inert gas. In view of ease of manufacture, it is more preferred to use air. After being cooled, the product is washed with distilled water and dried at a temperature preferably of 100° to 200° C. The product is a fibrous material, each fiber having an average diameter of up to about 10 microns and a length to diameter ratio of more than 5, and is milky or white in color. The thus obtained product basically is $M_2O.4TiO_2$ having the tetra-alkali titanate crystal structure, $M_2O.6TiO_2$ having the hexa-alkali titanate crystal structure or both of these.

It is a further discovery according to this invention that by re-heating the above-mentioned product at a temperature of 1000° to 1500° C, preferably 1200° to 1400° C, for 0.5 to 3 hours, it forms longer fibers and pure hexa-alkali titanate. It is more effective in making longer fibers to re-heat the product obtained in a molar ratio of 1.0 to 2.0 in terms of $TiO_2:M_2O$. If the re-heating temperature is too low, the effect of the re-heat treatment does not appear, and if the re-heating temperature is too high, the final product after the re-heating undesirably contains $TiO_2$(rutile). The re-heated product is a fibrous material, each fiber having a diameter of about 1 to about 20 microns and a length of about 5 to about 20 mm, and is pure hexa-alkali titanate.

It is another discovery according to this invention that by splattering the molten salt of titanium compound and alkali metal compound, amorphous alkali titanates having long fibrous forms can be obtained. The molten salt of a titanium compound and an alkali metal compound in a molar ratio of 1.0 to 8.0 in terms of $TiO_2:M_2O$ is dropped upon a rapid gas current, which gas is air, oxygen, nitrogen or inert gas, or a rapidly rotating rotor. Thereby, the molten salt is splattered and rapid-quenched. The product is colorless having long fibers and is amorphous in crystal structure. The more preferred molar ratio of $TiO_2$ to $M_2O$ of the above-mentioned molten salt is from 1.0 to 6.0 If the molar ratio is too small, the final product has a high hygroscopicity, and if the molar ratio is too large, the viscosity of the mixture is undesirably high at a heating temperature. By X-ray diffraction analysis, it can be determined that the final product is an fibrous amorphous alkali titanate with each fiber having a diameter of about 1 to about 100 microns and a length of more than about 20 mm.

The phase of a product by the method of this invention is confirmed by a D3-F type X-ray diffractionmeter (Rigakudenki Co., Japan) using copper $K\alpha$ radiation, and the composition of the product is confirmed by quantitative chemical analysis of titanium and alkali metal elements. The observation of the shape of a product is carried out by means of an optical microscope or an electron microscope. Fibrous alkali titanates thus obtained are suitable for thermal insulators, composite materials or paper pigments.

Embodiments of this invention will become clearer from the following examples, which, however, should not be considered limitative of the scope of this invention.

EXAMPLE 1

Mixtures of titanium dioxide (anatase), $TiO_2$, and potassium carbonate, $K_2CO_3$, were prepared as listed in Table 1. Each mixture was put into a platinum crucible having an inner volume of 10 milliliters, and water or 1 N KOH solution, at 100 percent of the basis of the total weight of $TiO_2$ and $K_2CO_3$ was added thereto. The crucible having the mixture therein was placed in an electric furnace of SiC. The mixture in the crucible was heated in air at the reaction temperature and for the reaction time listed in Table 1, and was furnace-cooled to room temperature (the cooling rate of 100° C/hr). The reaction product was taken out of the crucible and rinsed with distilled water. The product was milky or white in color. It was then dried at 150° C. From microscopic observation and X-ray diffraction analysis, it was found that each product was fibrous and was tetra-potassium titanate, hexa-potassium titanate or both of these. The compositions of some samples were confirmed by quantitative chemical analysis of Ti and K elements.

Table 1 shows the results of the average diameter (micron), the length to diameter (ratio) and the molar ratio of $TiO_2$ to $K_2O$ as determined by quantitative chemical analysis of the thus obtained products.

EXAMPLE 2

Mixtures of titanium compounds and alkai metal compounds were prepared as listed in Table 2. Each mixture was put into a platinum crucible having an inner volume of 10 milliliters and the solution shown in Table 2 was added thereto. The crucible having the mixture therein was placed in an electric furnace of SiC. The mixture in the crucible was heated in air at the reaction temperature and for the reaction time listed in Table 2 and was furnace-cooled to room temperature (the cooling rate of 100° C/hr). The subsequent procedure was carried out to obtain final products in the same manner as in Example 1. From microscopic observation and X-ray diffraction analysis, it was found that each final product was fibrous and was tetra-alkali titanate, hexa-alkali titanate or both. The composition of some of the thus made samples was confirmed by the quantitative chemical analysis of Ti and K elements.

Table 2 shows the results of the average diameter (micron), the length to diameter (ratio) and the molar ratio of $TiO_2$ to $M_2O$ as determined by quantitative chemical analysis of the thus obtained products.

EXAMPLE 3

Mixtures of titanium dioxide (anatase), $TiO_2$, and alkali metal compounds were prepared as listed in Table 3. Each mixture was put into a platinum crucible having an inner volume of 10 milliliters and water at 100 percent on the basis of the total weight of each mixture was added thereto. The crucible having the mixture therein was placed in an electric furnace of SiC. The mixture in the crucible was heated at 1300° C for 3 hours in air and was cooled to room temperature at the cooling rate shown in Table 3. The subsequent procedure was carried out to obtain final products in the same manner as in Example 1. The X-ray diffraction analysis showed that each final product having fibrous forms was a mixture of tetra-alkali titanate and hexa-alkali titanate.

Table 3 shows the results of the average diameter (micron) and the length to diameter (ratio) of the thus obtained products.

EXAMPLE 4

Mixtures of titanium compounds and potassium compounds were prepared as listed in Table 4. Each mixture was put into a platinum crucible having an inner volume of 10 milliliters. The crucible having the mixture therein was placed in an electric furnace of SiC. The mixture in the crucible was heated in the 1st reaction condition (heat-treatment) listed in Table 4, and was furnaced-cooled to room temperature. The reaction product taken out of the crucible was rinsed with distilled water, and dried at 150° C. The product was milky in color and dendritic in shape. Such dendritic product was put into a platinum crucible and was re-heated in the second reaction condition (heat-treatment) listed in Table 4 and was furnace-cooled to room temperature. The final product taken out of the crucible was rinsed with distilled water and dried at 150° C. The X-ray diffraction analysis indicated that each final product having fibrous form was only hexa-potassium titanate. The compositions of some of these samples were confirmed by the quantitative chemical analysis of Ti and K elements.

Table 4 shows the results of the diameter (micron), the length (mm), the crystal phase and the molar ratio of $TiO_2$ to $K_2O$ as determined by quantitative chemical analysis of the thus obtained products.

EXAMPLE 5

Mixtures of titanium dioxide and alkali metal compounds were prepared as listed in Table 5. Each mixture was put into a platinum having an inner volume of 10 milliliters. The crucible having the mixture therein was placed in an electric furnace of SiC. The mixture in the crucible was heated in the 1st reaction condition (heat-treatment) listed in Table 5, and was furnace-cooled to room temperature. The subsequent procedure was carried out to obtain final products in the same manner as in Example 4 except for the second reaction condition (heat-treatment) as apparent from comparison between Tables 4 and 5. The X-ray diffraction analysis showed that each final product having fibrous form was only hexa-alkali titanate.

Table 5 shows the results of the diameter (micron), the length (mm) and the crystal phase of the final products.

EXAMPLE 6

Mixtures of titanium dioxide (anatase) and potassium compounds were prepared as listed in Table 6. Each mixture was put into a platinum crucible which had an inner volume of 50 milliliters and a nozzle having a diameter of 1.5 mm on the bottom. The crucible having the mixture therein was placed in an electric furnace of SiC having an opening in its bottom. The mixture in the crucible was heated at a temperature and for a time listed in Table 6 to get to a molten state. The molten salt was then dropped through the aforesaid nozzle from the bottom of the furnace to stainless steel disk just below the furnace. The disk had a diameter of 30 cm and was rotating at a speed of 3500 r.p.m. Then, the molten salt was splattered by the centrifugal force of the rotating disk and was soldified by rapid air quenching. Colorless long fiber was obtained as a final product. The fibrous product was rinsed with distilled water and dried at 150° C. From the results of X-ray diffraction analysis, it was found that each product was amorphous.

Table 6 shows the results of the average diameter (micron) and the length to diameter (ratio) of the thus obtained products.

EXAMPLE 7

Mixtures of titanium compounds and alkali metal compounds were prepared as listed in Table 7. Each mixture was put into a platinum crucible which had an inner volume of 50 milliliters and a nozzle having a diameter of 1.5 mm on the bottom. The subsequent procedure was carried out in the same manner as done in Example 6.

Table 7 shows the results of the average diameter (micron) and the length to diameter (ratio) of the final products.

Table 1

| No. | Starting Material $TiO_2$ (g) | $K_2CO_3$ (g) | Solution (cc) | $TiO_2/K_2O$ (calculated) | Reaction Temperature (° C) | Reaction Time (hr) | Average Diameter (micron) | Length/Diameter (Average) | $TiO_2/K_2O$ (Analyzed) |
|---|---|---|---|---|---|---|---|---|---|
| 1 | 0.80 | 1.40 | $H_2O$ 2.2 | 1.0 | 1300 | 8.0 | 1.5 | 5 | 4.1 |
| 2 | 1.20 | 0.69 | $H_2O$ 1.9 | 3.0 | 1200 | 5.0 | 0.6 | 15 | — |
| 3 | 1.20 | 0.69 | $H_2O$ 1.9 | 3.0 | 1300 | 3.0 | 0.4 | 30 | 4.5 |
| 4 | 1.60 | 0.69 | $H_2O$ 2.3 | 4.0 | 1300 | 3.0 | 0.2 | 110 | 5.1 |
| 5 | 1.60 | 0.49 | 1N.KOH 2.1 | 4.0 | 1250 | 4.0 | 0.3 | 85 | — |
| 6 | 2.00 | 0.69 | $H_2O$ 2.7 | 5.0 | 1300 | 3.0 | 0.2 | 50 | 5.6 |
| 7 | 2.40 | 0.69 | $H_2O$ 3.1 | 6.0 | 1300 | 2.0 | 2.0 | 15 | 5.9 |
| 8 | 2.40 | 0.49 | 1N.KOH 2.9 | 6.0 | 1400 | 0.5 | 1.4 | 25 | — |
| 9 | 3.20 | 0.49 | 1N.KOH 3.7 | 8.0 | 1600 | 0.33 | 2.0 | 5 | 5.6 |

Table 2

| No. | Starting Material Titanium Compound (g) | Alkali-Metal Compound (g) | Solution (cc) | $TiO_2/M_2O$ (Calculated) | Reaction Temperature (° C) | Reaction Time (hr) | Average Diameter (micron) | Length Diameter (Average) | $TiO_2/K_2O$ (Analyzed) |
|---|---|---|---|---|---|---|---|---|---|
| 10 | $TiO_2$ 1.60 | KOH 0.56 | — | 4 | 1250 | 2.0 | 0.2 | 65 | 4.8 |
| 11 | $H_4TiO_4$ 2.32 | $K_2CO_3$ 0.69 | — | 4 | 1300 | 3.0 | 0.3 | 60 | — |
| 12 | $TiO_2$ 1.60 | $K_2O$ 0.47 | $H_2O$ 2.1 | 4 | 1200 | 8.0 | 0.1 | 35 | 4.9 |
| 13 | $TiO_2$ 2.40 | NaOH 0.40 | $H_2O$ 2.8 | 6 | 1350 | 3.0 | 1.3 | 12 | 5.9 |
| 14 | $Ti(OH)_4$ 2.32 | $Na_2CO_3$ 0.39 | 1N NaOH 2.7 | 4 | 1300 | 3.0 | 0.2 | 55 | — |
| 15 | $TiO_2$ 2.40 | $NaNO_3$ 1.24 | $H_2O$ 3.6 | 3 | 1200 | 4.0 | 0.3 | 25 | 4.6 |
| 16 | $TiO_2$ 1.60 | $Rb_2CO_3$ 1.15 | $H_2O$ 2.8 | 4 | 1300 | 3.0 | 0.2 | 20 | — |
| 17 | $TiO_2$ 1.60 | $Cs_2CO_3$ 1.63 | $H_2O$ 3.2 | 4 | 1300 | 4.0 | 0.1 | 30 | — |

Table 3

| No. | TiO₂ (g) | Alkali-Metal Compound (g) | Water (cc) | Reaction Temperature (° C) | Reaction Time (hr) | Cooling Rate (° C/hr) | Average Diameter (micron) | Length/Diameter (Average) |
|---|---|---|---|---|---|---|---|---|
| 18 | 1.60 | K₂CO₃ 0.69 | 2.3 | 1300 | 3 | 50 | 0.2 | 145 |
| 19 | 1.60 | K₂CO₃ 0.69 | 2.3 | 1300 | 3 | 250 | 0.2 | 55 |
| 20 | 1.60 | K₂CO₃ 0.69 | 2.3 | 1300 | 3 | 1600 | 0.1 | 5 |
| 21 | 1.60 | Na₂CO₃ 0.53 | 1.1 | 1300 | 3 | 100 | 0.2 | 75 |
| 22 | 1.60 | Na₂CO₃ 0.53 | 1.1 | 1300 | 3 | 500 | 0.1 | 20 |

Table 4

| No. | Titanium Compound (g) | Potassium Compound (g) | TiO₂/K₂O (calculated) | 1st. Heat-Treatment Temperature (° C) | Time (min) | 2nd. Heat-Treatment Temperature (° C) | Time (hr) | Diameter (micron) | Length (mm) | Phase K₂O·nTiO₂ | TiO₂/K₂O (Analyzed) |
|---|---|---|---|---|---|---|---|---|---|---|---|
| 23 | TiO₂ 1.2 | K₂CO₃ 1.4 | 1.5 | 1200 | 30 | 1200 | 1 | 1-10 | 5-20 | n=6 | — |
| 24 | TiO₂ 1.6 | K₂CO₃ 1.4 | 2.0 | 1300 | 20 | 1200 | 1 | 1-10 | 10-20 | n=6 | 6.1 |
| 25 | H₄TiO₄ 1.7 | KNO₃ 2.0 | 1.5 | 1200 | 20 | 1300 | 1 | 1-10 | 10-20 | n=6 | — |
| 26 | H₂TiO₃ 1.4 | KOH 1.6 | 1.0 | 1300 | 20 | 1200 | 2 | 1-10 | 5-10 | n=6 | — |

Table 5

| No. | TiO₂ (g) | Alkali-Metal Compound (g) | TiO₂/M₂O (Calculated) | 1st. Heat-Treatment Temperature (° C) | Time (min) | 2nd Heat-Treatment Temperature (° C) | Time (hr) | Diameter (micron) | Length (mm) | Crystal Phase K₂O·nTiO₂ |
|---|---|---|---|---|---|---|---|---|---|---|
| 27 | 1.6 | Na₂CO₃ 2.1 | 1.0 | 1200 | 20 | 1300 | 1 | 1-15 | 5-20 | n=6 |
| 28 | 0.8 | NaNO₃ 1.7 | 1.0 | 1200 | 20 | 1300 | 1 | 1-15 | 5-20 | n=6 |
| 29 | 0.8 | Rb₂CO₃ 2.3 | 1.0 | 1200 | 20 | 1300 | 1 | 1-10 | 5-15 | n=6 |
| 30 | 0.8 | Cs₂CO₃ 3.3 | 1.0 | 1200 | 20 | 1300 | 1 | 1-10 | 5-15 | n=6 |

Table 6

| No. | TiO₂ (g) | Potassium Compound (g) | TiO₂/K₂O (Calculated) | Reaction Temperature (° C) | Reaction Time (min) | Average Diameter (micron) | Length/Diameter (Average) |
|---|---|---|---|---|---|---|---|
| 31 | 10.0 | KOH 14.0 | 1.0 | 1200 | 20 | 10 | 5×10³ |
| 32 | 20.0 | KOH 14.0 | 2.0 | 1300 | 20 | 15 | 3×10³ |
| 33 | 15.0 | KOH 7.0 | 3.0 | 1400 | 20 | 25 | 1×10³ |
| 34 | 20.0 | KOH 7.0 | 4.0 | 1500 | 20 | 35 | 8×10² |
| 35 | 20.0 | KOH 4.7 | 6.0 | 1700 | 30 | 50 | 4×10² |
| 36 | 8.0 | KHO₃ 10.1 | 2.0 | 1300 | 20 | 15 | 3×10³ |
| 37 | 16.0 | KNO₃ 10.1 | 4.0 | 1400 | 20 | 40 | 1×10³ |
| 38 | 16.0 | K₂CO₃ 13.8 | 2.0 | 1300 | 20 | 20 | 2×10³ |
| 39 | 16.0 | K₂CO₃ 6.9 | 4.0 | 1400 | 20 | 40 | 8×10² |
| 40 | 16.0 | K₂O 6.3 | 3.0 | 1400 | 20 | 25 | 2×10³ |

Table 7

| No. | Titanium Compound (g) | Alkali-Metal Compound (g) | TiO₂/M₂O (Calculated) | Reaction Temperature (° C) | Reaction Time (min) | Average Diameter (micron) | Length/Diameter (Average) |
|---|---|---|---|---|---|---|---|
| 41 | TiO₂ 16.0 | NaOH 8.0 | 2.0 | 1400 | 20 | 10 | 4×10³ |

Table 7-continued

| | Starting Material | | | | | | |
|---|---|---|---|---|---|---|---|
| | Titanium Compound | Alkali-Metal Compound | $TiO_2/M_2O$ | Reaction Temperature | Reaction Time | Average Diameter | Length/Diameter |
| No. | (g) | (g) | (Calculated) | (° C) | (min) | (micron) | (Average) |
| 42 | $TiO_2$ 12.0 | RbOH 15.4 | 2.0 | 1400 | 20 | 20 | $1 \times 10^3$ |
| 43 | $TiO_2$ 8.0 | CsOH 15.0 | 2.0 | 1400 | 20 | 20 | $1 \times 10^3$ |
| 44 | $H_2TiO_3$ 14.7 | KOH 5.6 | 2.0 | 1400 | 20 | 15 | $3 \times 10^3$ |

What is claimed is:

1. A method of making fibrous alkali titanates consisting essentially of: preparing a molten mixture including a titanium compound and an alkali metal compound in a molar ratio of 1.0 to 8.0 in terms of $TiO_2:M_2O$ by heating, at a temperature of 1200° to 1600° C, a powder mixture including said titanium compound and said alkali metal compound in said molar ratio, M designating one or more elements selected from the group consisting of Na, K, Rb and Cs; cooling the thus heated mixture to room temperature; and washing the thus treated product.

2. A method according to claim 1, wherein said titanium compound is $TiO_2$, $Ti_2O_3$, $H_4TiO_4$, $H_2TiO_3$, $Ti(OH)_4$, $TiOSO_4$, $TiCl_2$, $TiCl_3$, $TiCl_4$, $Ti(SO_4)_2$ or $Ti_2(SO_4)_3$.

3. A method according to claim 1, wherein said titanium compound is $TiO_2$, $Ti_2O_3$, $H_4TiO_4$, $H_2TiO_3$ or $Ti(OH)_4$.

4. A method according to claim 1, wherein said alkali metal compound is $M_2O$, MOH, $M_2CO_3$, $MNO_3$, $MHCO_3$, $M_2SO_4$, MCl or MF.

5. A method according to claim 1, wherein said alkali metal compound is $M_2O$, MOH, $M_2CO_3$, $MNO_3$ or $MHCO_3$.

6. A method according to claim 1, wherein said mixture includes titanium and alkali metal in a molar ratio of 3.0 to 6.0 in terms of $TiO_2:M_2O$.

7. A method according to claim 1, wherein aid heating temperature is from 1200° to 1400° C.

8. A method according to claim 1, wherein said cooling rate is less than 1600° C/hr.

9. A method according to claim 1, which further consists essentially of the step of re-heating said washed product at a temperature of 1000° to 1500° C.

10. A method according to claim 9, wherein said mixture includes titanium and alkali metal in a molar ratio of 1.0 to 2.0.

11. A method according to claim 9, wherein said re-heating temperature is from 1200° to 1400° C.

12. A method according to claim 1, which further consists essentially of splattering the step of the heated mixture.

13. A method according to claim 12, wherein the mixture includes titanium and alkali metal in a molar ratio of 1.0 to 6.0.

14. A method according to claim 12, wherein said heating temperature is from 1200° to 1400° C.

* * * * *